United States Patent [19]
Venable

[11] Patent Number: 5,456,785
[45] Date of Patent: Oct. 10, 1995

[54] COMPOSITE ROOFING PRODUCT AND METHOD AND APPARATUS FOR MAKING A COMPOSITE ROOFING PRODUCT

[76] Inventor: Jesse S. Venable, Rte. 1, Herington, Kans. 67449

[21] Appl. No.: 243,703

[22] Filed: May 17, 1994

[51] Int. Cl.⁶ .................................................. B32B 31/12
[52] U.S. Cl. ........................... 156/229; 156/71; 156/281; 156/298; 52/408; 428/286; 428/288; 428/290
[58] Field of Search ............................ 156/71, 241, 230, 156/231, 229, 337, 279, 281, 298; 428/301, 495, 494, 40, 41, 288, 290, 291, 280, 282, 284, 286, 297; 52/408, 410, 411

[56] References Cited

U.S. PATENT DOCUMENTS

| | | | |
|---|---|---|---|
| H982 | 11/1991 | Berggren et al. | 264/171 |
| 3,252,257 | 5/1966 | Price | 156/71 X |
| 3,967,032 | 6/1976 | Plotz | 156/71 X |
| 4,039,706 | 8/1977 | Tajima | 428/40 X |
| 4,055,453 | 10/1977 | Tajima | 156/279 X |
| 4,073,997 | 2/1978 | Richards | 428/285 X |
| 4,248,926 | 2/1981 | Tajima | 428/253 X |
| 4,404,243 | 9/1983 | Terpay | 428/62 X |
| 4,827,686 | 5/1989 | Stamper et al. | 52/408 |
| 4,855,172 | 8/1989 | Chiu | 156/71 X |
| 4,920,720 | 5/1990 | LaBianca | 156/71 X |
| 4,944,818 | 7/1990 | Dybsky et al. | 156/71 X |
| 4,996,812 | 3/1991 | Venable | 52/408 |
| 5,206,068 | 4/1993 | Kalkanoglu | 428/143 X |
| 5,256,228 | 10/1993 | Davis | 156/71 X |

FOREIGN PATENT DOCUMENTS

| | | | |
|---|---|---|---|
| 2673220 | 8/1992 | France | 156/71 |
| 0450143 | 8/1990 | Germany. | |
| 4000560 | 7/1991 | Germany | 156/71 |
| 0022334 | 7/1975 | Japan | 156/71 |
| 9301852 | 3/1994 | United Kingdom. | |

Primary Examiner—David A. Simmons
Assistant Examiner—J. Sells
Attorney, Agent, or Firm—Litman, McMahon and Brown

[57] ABSTRACT

A composite roofing material includes a flexible rubber or thermoplastic sheet and a fleece-like matting with a polymeric film positioned therebetween. The polymeric film acts as a hot melt adhesive to cause the matting to adhere to the rubber or thermoplastic sheet. The composite material is made by abrading one side of the rubber or thermoplastic sheet, washing the abraded sheet, stretching the sheet, heating the rubber or thermoplastic sheet and then compressing the heated rubber or thermoplastic sheet together with the polymeric film and the fleece-like matting. By using a polymeric film and matting which is slightly narrower than the rubber or thermoplastic sheet, a selvedge is created along each longitudinal edge of the resultant roofing material to one of which a double sided tape can be adhered to facilitate sealing adjacent sheets of roofing material together. An apparatus for making the roofing material includes a reel support for reels of each of the rubber or thermoplastic sheet, the polymeric film and the fleece matting and pinch rollers which advance the rubber or thermoplastic sheet from its reel through an abrading roller, a rinsing vat, a stretcher, through a heater and then, along with the polymer film and the matting, through a pair of compression pinch rollers. A splicing table is provided for splicing sheets of the rubber or thermoplastic sheets together end to end.

20 Claims, 3 Drawing Sheets

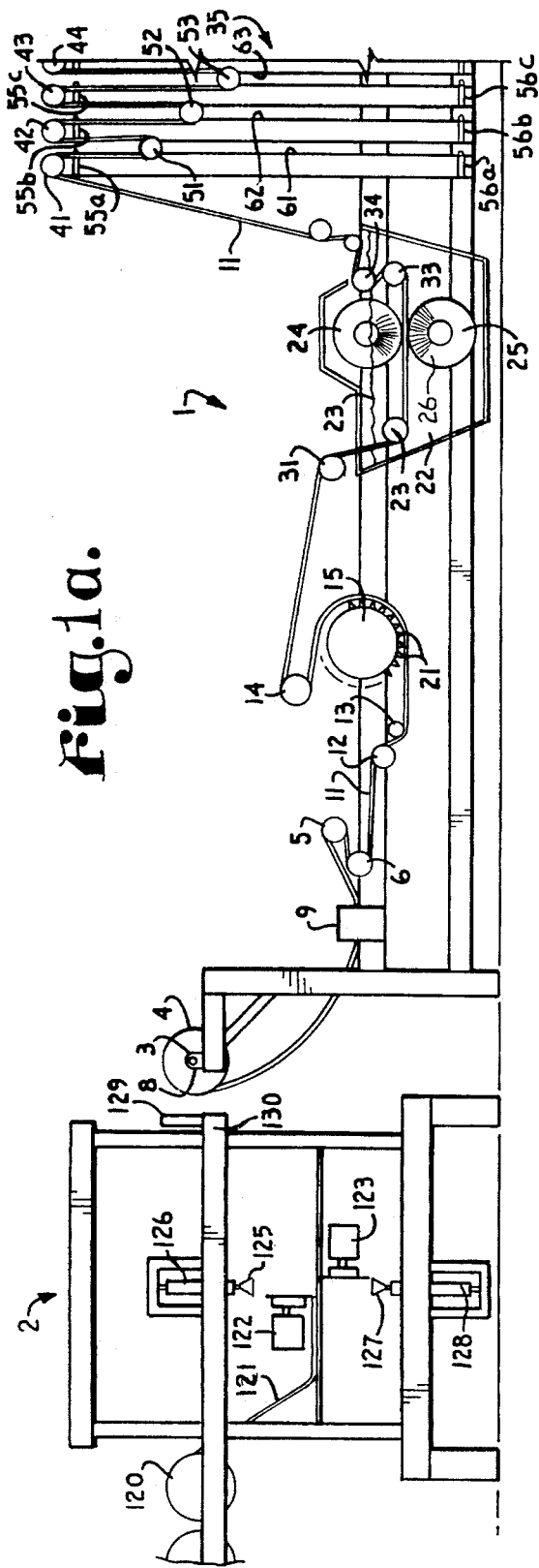
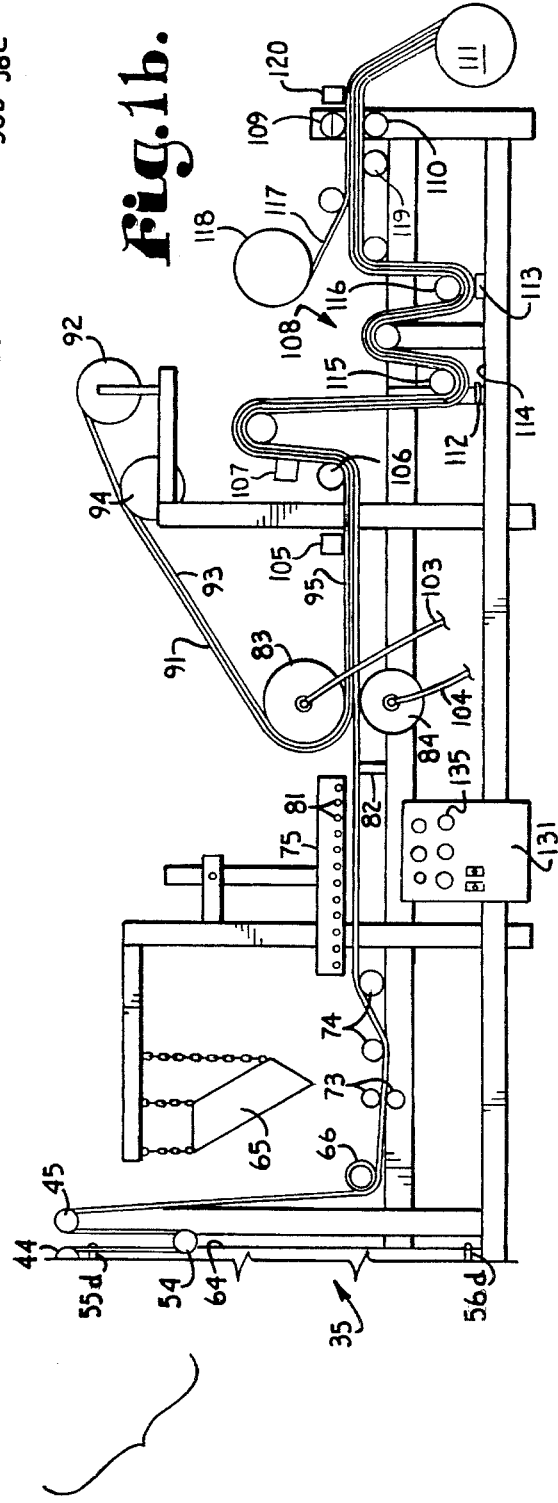
Fig. 1a.
Fig. 1b.

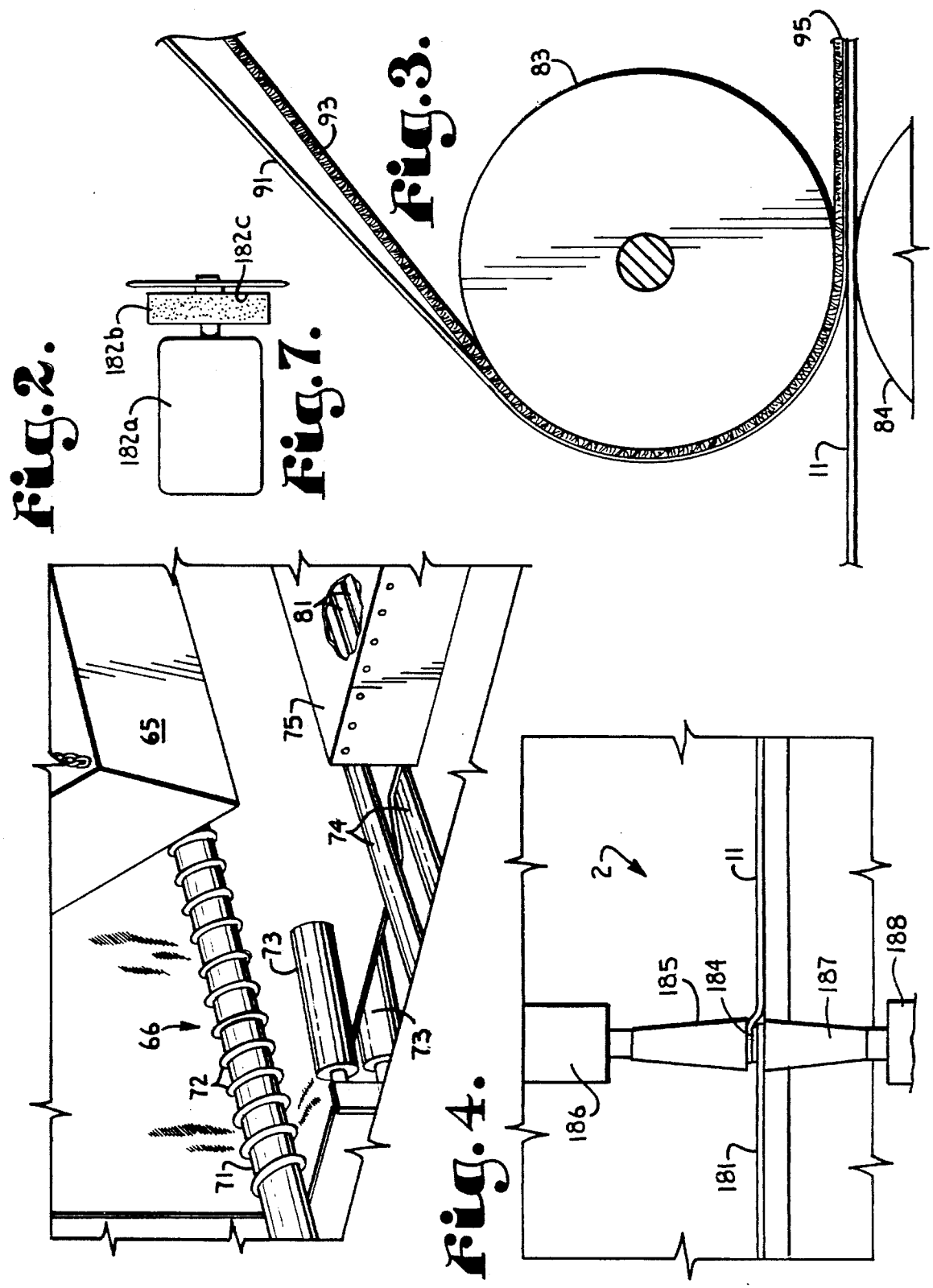

COMPOSITE ROOFING PRODUCT AND METHOD AND APPARATUS FOR MAKING A COMPOSITE ROOFING PRODUCT

BACKGROUND OF THE INVENTION

1. Field of the Invention

The present invention relates generally to a composite roofing product and a method and apparatus for making the composite roofing product which product includes a synthetic rubber or thermoplastic sheet and a fabric matting adhered together via a polymeric film or other uniformly applied hot melt adhesive.

2. Description of the Related Art

Continuous sheet roofing products have been increasingly used in commercial building applications which involve large roof expanses, particularly with flat or shallow pitched roofs. This popularity of sheet roofing is due to a variety of factors, including convenience and speed of installation, reduced material and labor costs and longevity and reliability of the installed roof. Many sheet roofing products include synthetic rubber or thermoplastic sheets which are applied from rolls and attached to the roof via a variety of adhesives and fasteners.

While synthetic rubber or thermoplastic sheets offer a number of advantages over competing products, including good weather resistance and elasticity, such rubber or thermoplastic sheets, in and of themselves are not very resistant to puncture or stress cracking. Furthermore, rubber or thermoplastic sheets, with their relatively smooth and moisture impervious surfaces, are resistant to bonding by most conventional adhesives, presenting a problem in reliably adhering the rubber or thermoplastic sheets to the roof surface. Finally, where contiguous rolls of rubber or thermoplastic sheets meet, they must overlap each other to form a weather impervious seal but these joints create a potential problem area where the overlapped rubber seams are adhered.

Previous attempts have been made to produce a composite roofing material including a synthetic rubber or thermoplastic sheet with a fabric backing adhered thereto. One such roofing material is a membrane including a synthetic rubber or thermoplastic sheet having a thickness of from 40–70 mils backed by a polyester fleece-like matting having a thickness of about 40–80 mils which is produced by the Colonial Rubber Company of Dyersburg, Tennessee. This product has proven to be very durable and crack and puncture resistant. In addition, the fleece-like matting provides an ideal bonding surface for roofing adhesives, such as the polyurethane foam adhesive taught in U.S. Pat. No. 4,996,812 (the '812 patent) to the present inventor, as well as asphalt and other adhesives.

Mass production of this composite material has proven to be problematical, however. In the known production method, the fleece-like matting is adhered to the rubber or thermoplastic sheet during the vulcanization process, thus substantially complicating the vulcanization process and requiring very expensive, dedicated production machinery. At least partially as a result of the complexity of the process and equipment, material waste averages in excess of 30%. Since the membrane product is produced during the vulcanization process, the wasted material has virtually no other use. Furthermore, it has proven impossible to produce a membrane with a selvedge on the underside of the membrane between the outside edge of the rubber or thermoplastic sheet and the polyester matting. This is because, if such a selvedge is left, once the membrane is rolled into a roll for vulcanizing, the exposed selvedges will stick to adjacent layers in the roll, thus resulting in a congealed mass.

It is clear then, that a need exists for an economical and reliable method of producing a composite roofing material including a flexible sheet backed by a fleece-like matting. Such a method should preferably use existing rolls of synthetic (such as EPDM) rubber, which are available in commodity quantities, and should produce a roofing material with minimal waste. The roofing material thus produced should preferably include a selvedge on each side of the material underside between the edge of the rubber or thermoplastic sheet and the matting for facilitating the attachment of sealing tape or adhesive between adjacent sheets as they are applied to a roof surface. An apparatus for producing the composite roofing material should be relatively economical to make and to run, and should be capable of producing large quantities of finished roofing material with minimal waste and a clean talc-free surface to adhere to.

SUMMARY OF THE INVENTION

In the practice of the present invention, a composite roofing material is produced by abrading one side of a synthetic rubber or thermoplastic sheet, washing and scrubbing the abraded sheet, and heating the sheet. The thus heated sheet is advanced between a pair of compression pinch rollers simultaneously with a thin polymeric film, such as polyethylene, and a polyester fleece-like matting. The heated rubber causes the polymeric film to melt and adhere the matting to the rubber or thermoplastic sheet. The rubber or thermoplastic sheet with the matting adhered is then cooled and rolled onto a reel. The matting and polymeric film are preferably both somewhat narrower than the rubber or thermoplastic sheet, thus leaving an exposed selvedge of rubber on both longitudinal edges of the underside of the roofing material. A strip of double sided tape and/or primer is optionally applied to one of these selvedges as the composite material is cooling to provide a convenient way for adjacent sheets of roofing to be attached to each other.

An apparatus for producing such a composite roofing material includes supports for a reel of sheet rubber and separate reels for polymeric film and polyester matting. The rubber or thermoplastic sheet is advanced its reel past an abrading roller which abrades one side of the sheet. The abraded sheet is then passed through a rinsing vat filled with water and cleaner. A pair of counter-rotating brushes in the vat thoroughly clean both sides of the rubber or thermoplastic sheet. The rubber or thermoplastic sheet is then advanced through an accumulator and, upon leaving the accumulator, through a preheat and stretching apparatus. Next the stretched rubber or thermoplastic sheet is passed through a heater where its surface temperature is raised to a range of 250 to 350 degrees Fahrenheit. The heated sheet is then pulled through a pair of compression pinch rollers simultaneously with the polymeric film or hot melt and the polyester matting. The polymeric film is essentially melted, causing the matting to adhere to the abraded side of the rubber or thermoplastic sheet to form a composite material. The thus formed material is then cooled and rolled into rolls of finished product. After the material passes through the compression pinch rollers, a tape applying roller and compressor optionally applies a strip of splicing tape and/or primer to one or both selvedges of the material.

OBJECTS AND ADVANTAGES OF THE PRESENT INVENTION

The objects and advantages of the present invention include: providing an improved composite roofing material; providing such a material which includes a flexible synthetic rubber outer layer and a fleece-like inner layer; providing such a material in which the rubber layer and the fleece layer are adhered together via a thin polymeric film or hot melt adhesive; to provide such a material in which a selvedge of exposed rubber is left on each longitudinal edge of the underside of the material; providing such a material in which a strip of double sided splicing tape is optionally attached to one or both selvedges of the material; providing a method of making a composite roofing material which minimizes waste and reliably produces a uniform product; providing a method of making the material in which a rubber or thermoplastic sheet is abraded, cleaned, stretched and heated and then compressed with a polymeric film or hot melt adhesive and a polyester matting; providing such a method of making the material in which the compressed rubber or thermoplastic sheet, polymeric film and polyester matting is cooled and rolled into rolls of final product; providing such a method in which sheets of rubber can be spliced end to end "on the fly"; providing such a method in which a selvedge of exposed rubber is created along both underside longitudinal edges of the composite material; providing such a method in which a strip of splicing tape and or primer is optionally applied to one or both of the selvedges; providing an apparatus for making a composite roofing material; providing such an apparatus in which a roll of synthetic sheet rubber is abraded, cleaned, stretched, heated, and then combined with a polymeric film or hot melt adhesive and a polyester matting; providing such an apparatus in which a splicing table is provided with which rolls of synthetic sheet rubber can be spliced end to end on the fly; and providing such a roofing material, a method of making roofing material and an apparatus for making roofing material which is economical, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIGS. 1A and 1B collectively are a schematic view of an apparatus for making a composite roofing material in accordance with the present invention.

FIG. 2 is a greatly enlarged, fragmentary perspective view of a portion of the apparatus of FIG. 1, illustrating a stretching roller and an attached coiled rod embedded with carborundum and an infrared heater with portions broken away to show heating rods.

FIG. 3 is a greatly enlarged and fragmentary side elevational view of the apparatus of FIG. 1, illustrating a pair of compression pinch rollers and three separate material webs being compressed into a single composite roofing material.

FIG. 4 is an enlarged, fragmentary side elevational view of a portion of a splicing table of FIG. 1, illustrating a splicing operation between a pair of synthetic rubber or thermoplastic sheets with two pressure heating bars.

FIG. 7 is a greatly enlarged side elevational view of one of the cutting and abrading wheels of the splicing table of FIG. 1.

DETAILED DESCRIPTION OF THE PREFERRED EMBODIMENTS

I. Introduction and Environment

Figure 6:
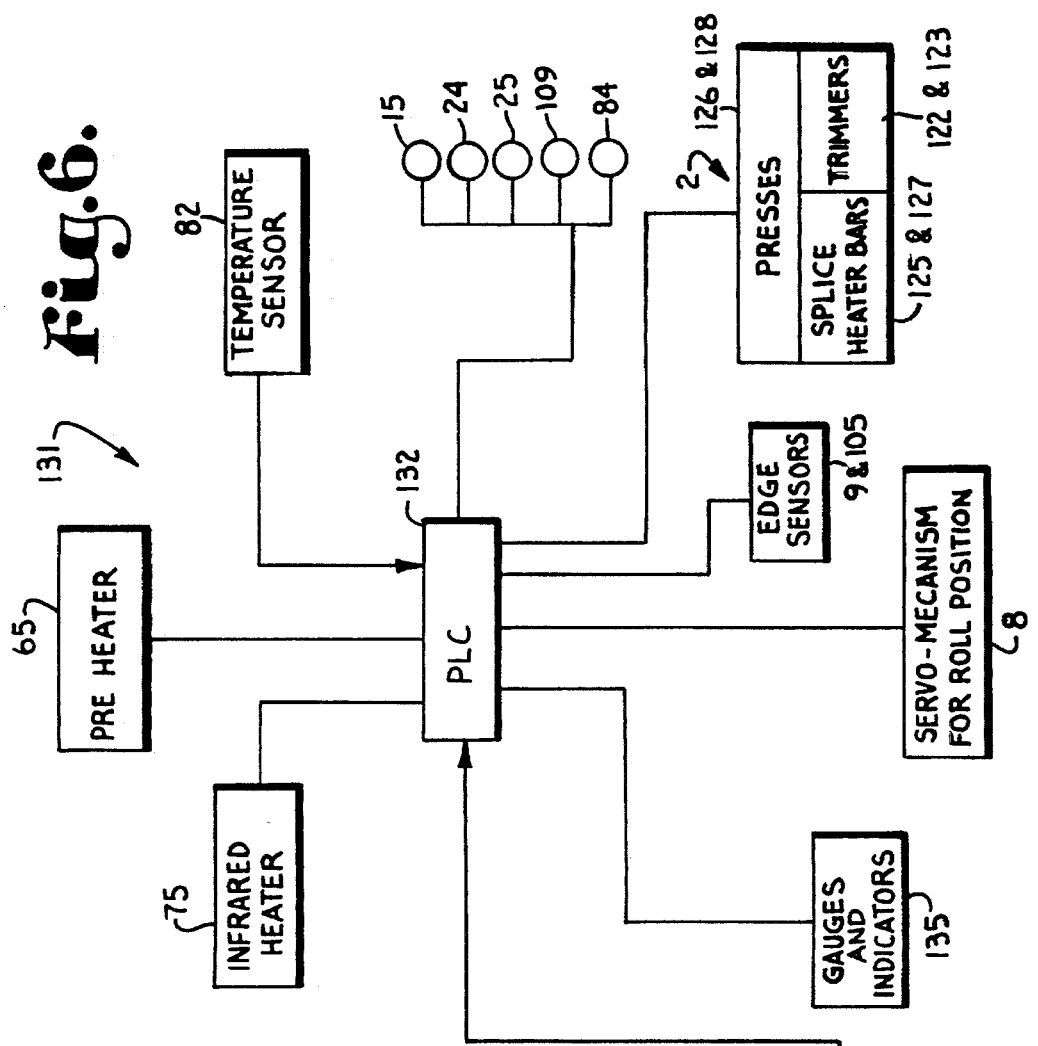
FIG. 6 is a block diagram of a control circuit for controlling the apparatus of FIG. 1.

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

II. Apparatus

Referring to the drawings in more detail, and particularly to FIGS. 1A and 1B, reference numeral 1 designates an apparatus for making composite roofing material in accordance with the present invention. A splicing table 2 is also shown for splicing sheets of synthetic rubber material together end to end, as will be explained more fully below.

The apparatus 1 includes a first reel support 3 for supporting a reel 4 of synthetic rubber or thermoplastic sheeting. A pair of drive rollers 5 and 6 pull a rubber or thermoplastic sheet 11 from the reel 4. The lateral position of the reel 4 is adjusted by a servo-mechanism 8, which is controlled by an edge position sensor 9. The sensor 9, for example, can include a pair of LED's and corresponding light sensitive sensors placed, respectively, above and below and astride the desired edge position of the rubber or thermoplastic sheet 11. When one sensor is blocked and one sensor is receiving light, the reel 4 is correctly positioned, but when both or neither sensor is receiving light, the servo-mechanism 8 must be adjusted one way or the other until correctly positioned. The sheet 11 is then fed into a first pair of tensioning rollers 12 and 13. The tensioning rollers 12 and 13, in cooperation with a tensioning roller 14, constrain the rubber or thermoplastic sheet 11 and pull it against a motor driven abrading roller 15. The roller 15 is shown equipped with abrading teeth 21, but an otherwise smooth roller coated with industrial diamond dust, carborundum grit or the like is suitable as well. The abrading roller 15 effectively removes the ordinary non-stick talc coating typically applied to synthetic rubber or thermoplastic sheets after the vulcanization process. From the tensioning roller 14, the rubber or thermoplastic sheet 11 is passed through a rinsing vat 22 containing water 23 or other cleaning fluid. Within the vat 22 a pair of counter-rotating cylindrical brushes 24 and 25 thoroughly clean both sides of the sheet 11 while removing any particles remaining from the abrading action of the roller 15. Again, tensioning rollers 31–34 pull the sheet taught against the brushes 24 and 25.

From the vat 22, the rubber or thermoplastic sheet 11 is pulled upward into a dryer and accumulator, generally indicated at 35. The accumulator 35, which overlaps between FIG. 1A and FIG. 1B, includes a number of fixed rollers 41–45, here shown as 5 in number, and a plurality of movable rollers 51–54, here shown as 4 in number. As is conventional in such accumulators, the movable rollers 51–54 are weighted and are free to move up and down within respective slots 61–64 to hold a variable length of rubber or thermoplastic sheet 11. A plurality of position sensors 55a–55c are provided at the top of each slot 61–64 and a plurality of proximity switches 56a–56d to sense the positions of movable rollers 51–54 at the uppermost and lowermost positions, respectively, within their respective slots 61–64 to thereby control cycles of the abrading roller 15 and the brushes 24 and 25 as well as pinch rollers 5 and 6, as will be explained below. The accumulator 35 thus acts as a buffer to store a length of the rubber or thermoplastic sheet 11 sufficient to compensate for speed differences before and after the accumulator 35.

From the accumulator 35, the rubber or thermoplastic sheet 11 is drawn downward past a preheater 65 and then against a stretching roller 66. The preheater 65 preheats the sheet 11 to render it more pliable to facilitate stretching. The stretching roller 66 is better illustrated in FIG. 2. Referring to FIG. 2, the stretching roller 66 includes a relatively small diameter cylinder 71 about which is tightly wrapped and welded a coiled rod 72. The cylinder 71 is rotated counterclockwise (as shown in FIG. 2) at a speed such that the outer surface of the coiled rod 72 spins faster than the rate at which the rubber or thermoplastic sheet 11 is advancing. This causes the sheet 11 to be stretched in width as it passes the roller 66. Still referring to FIG. 2, two opposed pairs of edge steering rollers 73, of which only one is illustrated, act to smooth the edges of and steer the sheet 11 as it exits the stretching roller 66.

From the edge rollers 73, the sheet 11 passes through a guide rollers 74 and beneath an infrared heater 75. Again referring to FIG. 2, the heater 75 can include a plurality of resistive rods 81 which are heated by the application of an electrical current. While only one heater 75 is shown, it should be noted that multiple ones of these heaters can be positioned both above and below the sheet 11 to increase the heating efficiency of the apparatus 1. For the best results it has been determined that the rubber or thermoplastic sheet 11 must be heated to a surface temperature range of 275–350 degrees Fahrenheit, depending upon what adhesive media is used.

Referring to FIGS. 1B and 3, the rubber or thermoplastic sheet 11, upon leaving the heater 75, is drawn past a temperature sensor 82, and then through a pair of compression pinch rollers 83 and 84, of which one or both rollers 83 and 84 may be driven. The temperature sensor 82 is used to control the speed of the compression pinch roller 84, as will be explained below. At this point, the abraded side of the rubber or thermoplastic sheet 11 is compressed by the rollers 83 and 84 along with a continuous length of thin polymer film 91 extending from a reel 92 and a continuous sheet of fleece-like polyester matting 93 extending from a reel 94 to yield a sheet of composite roofing material 95. Preferably both the polymer film 91 and the matting 93 are somewhat narrower than the rubber or thermoplastic sheet 11, thus leaving an exposed selvedge 101 and 102, respectively (FIG. 5), on the underside of either longitudinal edge of the composite sheet 95. In order to begin cooling the composite roofing sheet 95, as well as to control the temperature of the pinch rollers 83 and 84, heating and cooling water is circulated through the pinch rollers 83 and 84 via respective supply pipes 103 and 104 and opposite drain pipes (not shown). Although the preferred embodiment is illustrated as using the thin polymer film 91 to perform essentially as a hot melt adhesive, it should be emphasized that, instead of a film 91, an extruded hot melt adhesive (not shown) can be applied to the heated sheet 11 which can then be compressed with the matting 93 to form the roofing material 95.

Figure 5:
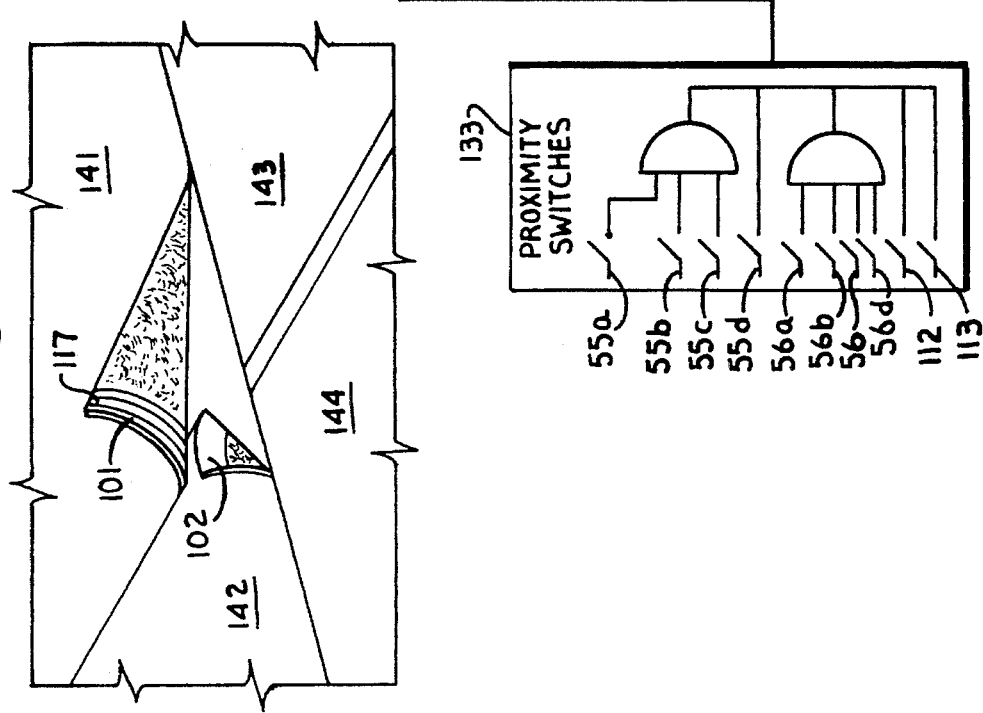
FIG. 5 is a fragmentary perspective view of a number of sheets of composite roofing material according to the present invention with the sheets being installed on a roof, and with edges of two adjoining sheets rolled over to illustrate respective selvedges and the placement of double sided splicing tape.

From the compression pinch rollers 83 and 84, the composite roofing sheet 95 is pulled beneath a pair of edge sensors 105, only one of which is shown. The edge sensors 105 detect the edges of the sheet 95 to provide accurate steering data. The sheet 95 is then pulled past a tension roller 106 and a primer applicator 107 which optionally applies a layer of primer to one or both the selvedges 101 and 102. The composite sheet 95 is then passed through a second, smaller accumulator 108 and then past a pair of variable speed exit pinch rollers 109 and 110 where it is loaded onto a motor driven reel 111. Within the accumulator 108, a pair of position sensing proximity switches 112 and 113 are positioned within a pair of slots 114 to sense the position of a respective pair of movable rollers 115 and 116. These switches 112 and 113 control the exit pinch rollers 109 and 110, as explained below. At this point a double-sided splicing tape 117 is optionally applied from a tape reel 118 to the selvedge 101 (FIG. 5). The sheet 95 at this point still retains considerable heat, which facilitates the adherence of the tape 117 to the sheet 95. The tape 117 preferably has a peelable non-stick covering over the exposed upper side. A primer applied by the applicator 107 can facilitate the adherence of the tape 117 to the sheet 95. A length measurement sensor 119 is located just ahead of the pinch rollers 109 and 110 to measure the length of the roofing sheet 95 and to control a cutter 120 to create rolls of a particular length.

The composite sheet 95 is shown in a closer approximation to scale in FIG. 3. Typical thicknesses for the rubber or thermoplastic sheet 11 range from 30 to 80 mils, for the polymer film 91 (or other hot melt adhesive) from 1 to 5 mils, and for the polyester matting 93 from 30 to 80 mils. A successful production run has been made with a EPDM rubber sheet 11 of between 45 and 60 mils, a polyethylene film 91 of 1.5 mils and a polyester matting 93 of 55 mils.

III. Splicing Table

Referring to FIGS. 1A, 4 and 7, a portion of the splicing table 2 is shown in greater detail, with a reel 120 from which a second synthetic rubber or thermoplastic sheet 121 is drawn, being spliced end to end with the first sheet 11. The sheet 121 is trimmed and abraded by a top edge trimmer and abrading wheel 122 while the sheet 11 is trimmed and abraded by a bottom edge trimmer and abrading wheel 123. The trimmer and abrading wheels 122 and 123 are identical and thus only the upper trimmer 122 is illustrated in detail in FIG. 7. The trimmer 122 includes a motor 122a which drives both an abrading wheel 122b and a cutter wheel 122c. The trimmer 122 can be selectively lowered into place and moved along the end of the sheet 121 to both uniformly trim the sheet end via the cutting wheel 122c and abrade the surface of the sheet 121 to remove any talc therefrom and prepare the surface for adhesion of a length of heat sensitive double-sided splicing tape 124. The tape strip 124 is inserted between the overlapping edges of the sheets 121 and 11. A top heating and compression bar 125 is lowered into contact with the overlapped edges by a press 126, with the top bar 125 urging the overlapped edges into contact with a bottom heating and compression bar 127 and press 128. The bars 125 and 127 heat the splice to a temperature at which the tape 124 will successfully adhere to both sheets 121 and 11 while simultaneously applying pressure to yield an even splice. Referring to FIG. 1A, with the splicing table 2 positioned in front of the apparatus 1, the reel 4 can be spliced together with the reel 120 "on the fly", i.e. as the apparatus 1 continues to make composite roofing material, to avoid shutting down production as the reel 4 is used up. A hinged extension 129 of a reel track 130 can be lowered to allow the reel 120 to be easily moved over the splice table 2 and onto the reel support 3 of the apparatus 1.

IV. Control Circuit

Referring to FIGS. 1B and 6, a control panel 131 includes a Programmable Logic Controller or PLC 132. The PLC 132 is connected to various sensors, including the temperature sensor 82, the accumulator position sensors 55a–d, 56 a–d, 112 and 113, and the edge sensor 9. In response to the temperature sensor 82, the PLC 132 controls the speed of compression pinch roller 84 to thereby control the duration of time that a given segment of the sheet 11 remains in proximity to the heater 75. The PLC 132 is responsive to the edge sensor 9 to control the position of servo-mechanism 8 to thereby control the lateral position of reel 4. The PLC 132 is also responsive to the accumulator position sensors 55a–d and 56a–d, as well as the accumulator position sensors 116 and 117, which can be proximity switches logically combined by the PLC 132, as shown in block 133.

Referring to block 133, the top switches 55a–55c are logically ANDed together by the PLC 132 to provide a combined feed output signal when all three are ON which causes the PLC 132 to start the abrading roller 15 and brushes 24 and 25 and associated drive rollers to thereby feed more of the rubber or thermoplastic sheet 11 to the accumulator 35. The switch 55d is separately monitored for an emergency stop signal which shuts off the entire apparatus 1 should the accumulator 35 become totally empty. Similarly, the bottom four switches 56a–56d are ANDed together to provide an accumulator full output signal when all four are ON which causes the PLC 132 to temporarily stop the abrading roller 15 and brushes 24 and 25 and associated drive rollers. The two proximity switches 112 and 113 in the accumulator 108 are monitored by the PLC 132 which is responsive to both switches being ON to start the exit pinch rollers 106 and 107. The PLC 132 continues to drive the pinch rollers 109 and 110 until both switches 112 and 113 are OFF. Finally the PLC 132 is connected to the splice table 2 to control the trimmer and abraders 122 and 123, the splicing heater bars 125 and 127 and the presses 126 and 128, and to a plurality of gauges and indicators 135.

V. Composite Roofing Material

A number of sheets 141–144 of the composite roofing material 95 made by the apparatus of FIGS. 1–4 and 6 is illustrated in FIG. 5 being applied to a roof. Each sheet 141–144 includes 2 selvedges 101 and 102 which extend longitudinally along the underside edges of each sheet. The selvedge 101 includes a strip of the double-edged splicing tape 117 applied thereto, as described above. As shown in FIG. 5, when the sheets 141 and 142 are being applied to a roof, for example via an adhesive as taught in the '812 patent, the selvedge 101 of sheet 141, with the tape strip 106 is overlayed over the selvedge 102 of adjacent sheet 142. Given relative thicknesses of rubber or thermoplastic sheet 11 and polyester matting 93 similar to those earlier described, e.g. 45 mils to 55 mils, respectively, a seam between adjacent sheets 141 and 142 which incorporates tape of a thickness less than 40 mils would lie approximately flat on the roof surface, thus greatly speeding up the application process and avoiding many of the problems of prior art applications.

While the apparatus 1 has been illustrated with a specific arrangement of reels, drive rollers, abrading roller, accumulator, heater, etc., it should be noted that many alternative arrangements could produce composite roofing materials of the type contemplated. In addition, the PLC controller 132 can control other variables such as heat output in addition to compression roller speed to vary heat application. Therefore, it is to be understood that while certain forms of the present invention have been illustrated and described herein, it is not to be limited to the specific forms or arrangement of parts described and shown.

What is claimed and desired to be secured by Letters Patent is as follows:

1. A method of making a composite roofing material comprising the steps of:
   a. heating a vulcanized flexible sheet;
   b. coating one side of said heated vulcanized flexible sheet with a hot melt adhesive and compressing said one coated side of said heated vulcanized flexible sheet against one side of a fleece-like matting.

2. A method as in claim 1, wherein said hot melt adhesive is in the form of a polymer film, said compressing step including compressing said polymer film between said one side of said vulcanized flexible sheet and said one side of said matting.

3. A method as in claim 2, and further comprising:
   a. abrading said one side of said vulcanized flexible sheet prior to said heating step.

4. A method as in claim 2, and further comprising:
   a. rinsing and scrubbing said vulcanized flexible sheet prior to said heating step to remove any talc or other non-stick coating material from the surface of said thermoset flexible sheet.

5. A method as in claim 2, and further comprising:
   a. stretching said vulcanized flexible sheet prior to said compressing step.

6. A method as in claim 2, and further comprising:
   (a) cooling said composite roofing material after said compressing step.

7. A method as in claim 6, and further comprising the step of rolling said roofing material into a roll after said cooling step.

8. A method as in claim 2, wherein said polymeric film and said fleece-like matting are narrower in width than said vulcanized flexible sheet and wherein said compressing step results in a selvedge between an edge of said vulcanized flexible sheet and an edge of said fleece-like matting on at least one longitudinal edge of said composite roofing material.

9. A method as in claim 8, and wherein said compressing step results in a selvedge on each longitudinal edge of said composite roofing material.

10. A method as in claim 9 and further comprising:
    (a) applying a strip of double sided adhesive tape to at least one of said selvedges after said compressing step.

11. A method as in claim 1, wherein said vulcanized flexible sheet is an EPDM rubber sheet.

12. A method of making a composite roofing material comprising the steps of:
    a. abrading one side of a vulcanized synthetic rubber sheet;
    b. rinsing and scrubbing said vulcanized rubber sheet to remove any talc or other non-stick coating material from the surface of said vulcanized synthetic rubber sheet:
    c. heating said vulcanized rubber sheet; and
    d. compressing said one side of said heated vulcanized rubber sheet with one side of a polymeric film while simultaneously compressing one side of a fleece-like matting with the other side of said polymeric film.

13. A method as in claim 12, and further comprising the step of stretching said vulcanized rubber sheet prior to said heating step.

14. A method as in claim 12, and further comprising the step of rolling said roofing material into a roll.

15. A method as in claim 12, wherein said polymeric film and said fleece-like matting are narrower in width than said vulcanized rubber sheet and wherein said compressing step results in a selvedge between an edge of said vulcanized rubber sheet and an edge of said fleece-like matting along at least one longitudinal edge of said composite roofing material.

16. A method as in claim 15, and wherein said compressing step results in a selvedge on each longitudinal edge of said composite roofing material.

17. A method as in claim 16, and further comprising the step of applying a strip of double sided adhesive tape to one of said selvedges after said compressing step.

18. A method as in claim 12, wherein said vulcanized rubber sheet is an EPDM rubber sheet.

19. A method of making a composite roofing material comprising the steps of:

a. rinsing and scrubbing a vulcanized rubber sheet to remove any talc or other non-stick coating material from the surface of said vulcanized rubber sheet:

b. heating said vulcanized rubber sheet; and c. compressing one side of said heated vulcanized rubber sheet with one side of a polymeric film while simultaneously compressing one side of a fleece-like matting with the other side of said polymeric film.

20. A method of making a composite roofing material comprising the steps of:

a. rinsing and scrubbing a vulcanized rubber sheet to remove any talc or other non-stick coating material from the surface of said vulcanized rubber sheet:

b. heating said vulcanized rubber sheet; and c. compressing one side of said heated vulcanized rubber sheet with one side of a polymeric film while simultaneously compressing one side of a fleece-like matting with the other side of said polymeric film;

d. said polymeric film and said fleece-like matting being narrower in width than said vulcanized rubber sheet wherein said compressing step results in a selvedge between an edge of said vulcanized rubber sheet and an edge of said fleece-like matting along at least one longitudinal edge of said composite roofing material.

\* \* \* \* \*